United States Patent [19]

Wu et al.

[11] Patent Number: 4,671,618

[45] Date of Patent: Jun. 9, 1987

[54] LIQUID CRYSTALLINE-PLASTIC MATERIAL HAVING SUBMILLISECOND SWITCH TIMES AND EXTENDED MEMORY

[76] Inventors: Bao-Gang Wu, 947 Allerton St.; J. William Doane, 1618 S. Lincoln St., both of Kent, Ohio 44240

[21] Appl. No.: 879,327

[22] Filed: Jun. 27, 1986

Related U.S. Application Data

[63] Continuation-in-part of Ser. No. 866,216, May 22, 1986, which is a continuation-in-part of Ser. No. 776,851, Sep. 17, 1985, which is a continuation-in-part of Ser. No. 590,996, Mar. 19, 1984, abandoned.

[51] Int. Cl.$^4$ .............................................. G02F 1/13
[52] U.S. Cl. .............................. 350/347 V; 350/320; 350/350 R
[58] Field of Search ............... 350/320, 347 V, 347 R, 350/350 R, 351

[56] References Cited

U.S. PATENT DOCUMENTS

| | | |
|---|---|---|
| 2,123,902 | 7/1938 | Land . |
| 3,529,156 | 9/1970 | Fergason et al. . |
| 3,578,844 | 5/1971 | Churchill et al. ................... 350/351 |
| 3,585,381 | 6/1971 | Hodson et al. ...................... 250/47 |
| 3,600,060 | 8/1971 | Churchill et al. ............... 350/351 X |
| 3,620,889 | 11/1971 | Baltzer ................................ 161/5 |
| 3,661,142 | 5/1972 | Flam ................................. 128/2 H |
| 3,663,390 | 5/1972 | Fergason et al. ............ 204/158 HE |
| 3,697,297 | 10/1972 | Churchill et al. ................... 350/351 |
| 3,720,623 | 3/1973 | Cartmell et al. ..................... 252/316 |
| 3,746,426 | 7/1973 | Masi . |
| 3,748,017 | 7/1973 | Yamamura et al. . |
| 3,766,061 | 10/1973 | Mahler et al. . |
| 3,771,855 | 11/1973 | Burns . |
| 3,772,518 | 11/1973 | Murayama et al. ............. 250/211 R |
| 3,781,085 | 12/1973 | Leibowitz . |
| 3,795,529 | 3/1974 | Cartmell et al. . |
| 3,804,618 | 4/1974 | Forest et al. ......................... 96/1 R |
| 3,816,786 | 6/1974 | Churchill et al. ..................... 313/91 |
| 3,852,092 | 12/1974 | Patterson et al. .................. 117/36.7 |
| 3,864,023 | 2/1975 | Glaser et al. .................... 117/217 X |
| 3,872,050 | 6/1975 | Benton et al. .................. 350/351 X |
| 3,877,790 | 4/1975 | Robinson . |

(List continued on next page.)

FOREIGN PATENT DOCUMENTS

| | | |
|---|---|---|
| 2139537 | 1/1973 | France .......................... 350/331 R |
| 55-96922 | of 0000 | Japan . |
| 51-30998 | 9/1976 | Japan . |

OTHER PUBLICATIONS

Craighead, et al., "New Display Based on Electrically Induced Index Matching in an Inhomogeneous Medium", Appl. Phys. Lett., vol. 40, No. 1, Jan. 1, 1982, pp. 22–24.

Primary Examiner—Bruce Y. Arnold
Assistant Examiner—Richard F. Gallivan
Attorney, Agent, or Firm—Watts, Hoffmann, Fisher & Heinke Co.

[57] ABSTRACT

The invention provides a new liquid crystal-plastic display material having submillisecond switching times and an electrooptic bistable memory. The material comprises microdroplets of liquid crystal dispersed in a plastic matrix, the liquid crystal being present in an amount of at least 50% by weight. The material is prepared by the phase separation of a homogeneous solution of liquid crystal and synthetic polymer. Phase separation results in a liquid crystalline rich phase in the form of microdroplets and a plastic rich phase containing dissolved liquid crystal in solid solution with the plastic. The dissolved liquid crystal alters refractive index and the dielectric properties of the polymer, and lowers the temperature at which the plastic softens, making possible the fabrication of liquid crystal display materials having submillisecond switching rates and transparencies on the order of 90% and further having sufficiently high resistivity and permittivity so as to act as capacitors to maintain images for extended bistable memory.

18 Claims, 3 Drawing Figures

U.S. PATENT DOCUMENTS

| | | | |
|---|---|---|---|
| 3,885,982 | 5/1975 | Fergason | 106/252 |
| 3,892,471 | 7/1975 | Biermann et al. | 313/517 X |
| 3,912,366 | 10/1975 | Sprokel . | |
| 3,932,024 | 1/1976 | Yaguchi et al. . | |
| 3,935,337 | 1/1976 | Taylor | 427/180 |
| 3,961,843 | 6/1976 | Nakamura et al. . | |
| 3,969,264 | 7/1976 | Davis . | |
| 3,985,427 | 10/1976 | Masi . | |
| 3,990,782 | 11/1976 | Yamasaki . | |
| 3,998,210 | 12/1976 | Nosari | 128/2 H |
| 4,022,706 | 5/1977 | Davis | 252/299.1 |
| 4,023,890 | 5/1977 | Shirasu et al. . | |
| 4,048,358 | 9/1977 | Shanks | 350/351 X |
| 4,070,912 | 1/1978 | McNaughton et al. | 73/356 |
| 4,161,557 | 7/1979 | Suzuki et al. | 428/1 |
| 4,200,361 | 4/1980 | Malvano et al. | 350/336 |
| 4,218,281 | 8/1980 | Doriguzzi et al. | 156/281 |
| 4,297,401 | 10/1981 | Chern et al. | 428/1 |
| 4,301,023 | 11/1981 | Schuberth et al. | 252/299.1 |
| 4,310,557 | 1/1982 | Davison et al. | 428/1 |
| 4,325,610 | 4/1982 | Inoue | 350/343 |
| 4,388,139 | 6/1983 | Fuller | 156/307.5 |
| 4,401,537 | 8/1983 | Chern et al. | 204/159.11 |
| 4,418,102 | 11/1983 | Ferrato | 428/1 |
| 4,427,888 | 1/1984 | Galvin | 250/331 |
| 4,435,047 | 3/1984 | Fergason | 350/350 R X |
| 4,468,137 | 8/1984 | Hilsum et al. | 374/160 |
| 4,470,668 | 9/1984 | Inoue et al. | 350/343 |
| 4,550,171 | 10/1985 | Mockli | 548/159 |
| 4,556,289 | 12/1985 | Fergason | 350/350 R |
| 4,596,445 | 6/1986 | Fergason | 350/347 V |
| 4,601,545 | 7/1986 | Kern | 350/347 V |

LIQUID CRYSTALLINE-PLASTIC MATERIAL HAVING SUBMILLISECOND SWITCH TIMES AND EXTENDED MEMORY

RELATED APPLICATION

This application is a continuation-in-part of U.S. patent application Ser. No. 866,216, filed May 22, 1986 which is a continuation-in-part of U.S. patent application Ser. No. 776,831, filed Sept. 17, 1985, which is a continuation-in-part of U.S. patent application Ser. No. 590,996, filed Mar. 19, 1984, now abandoned.

TECHNICAL FIELD

This invention relates generally to liquid crystal display technology and, more specifically, to a new liquid crystalline-plastic material having submillisecond switch times and electrooptic memory. The material has a high electrical resistivity and permittivity and comprises microdroplets of liquid crystal phase separated in situ from a homogeneous solution of liquid crystal and polymer, the liquid crystal being present in the material in an amount of at least 50% by weight

BACKGROUND ART

As disclosed in U.S. patent applications Ser. No. 776,831, filed Sept. 17, 1985 and Ser. No. 866,216, filed May 22, 1986, the disclosures of which are incorporated by reference, liquid crystal display devices which exploit the light scattering and transmitting properties of discrete quantities of liquid crystal can be fabricated by polymerization induced phase separation of homogeneous solutions of liquid crystal and various synthetic polymers. The liquid crystal-polymeric material can be formed as a film or sheet and placed between transparent conducting electrodes to form an electrically switchable light shutter.

Liquid crystals useful for light scattering displays have two indices of refraction: an extraordinary index of refraction $n_e$ measured along the long axis of the liquid crystals, and a smaller ordinary index of refraction $n_o$, measured in a plane perpendicular to the long axis. The long axis of the liquid crystal defines its optic axis.

Entrapping liquid crystals in microdroplets in a polymeric matrix having an index of refraction $n_s$ will result in a device which either scatters or transmits incident light depending upon the relationship among the indices of refraction and dependent upon the microdroplets being of a size to scatter incident light, e.g., on the order of 0.1 to 10 microns.

In the absence of an applied field, the optic axes of the microdroplets have no preferred direction in which to point, so that incident light encounters a mismatch between the $n_s$ of the matrix and the $n_e$ of the microdroplets. The result of the mismatch is that the light is scattered and the device appears opaque. Application of an electric field across the sheet of liquid crystalline-polymeric material causes the optic axes to align parallel to the field and normal to the surface of the sheet. Incident light detects no mismatch between $n_o$ and $n_s$ and is transmitted so that the device appears clear.

Liquid crystal devices as disclosed in U.S. patent application Ser. No. 776,831 do not have an image memory. Images formed by contrasting opaque and clear areas are displayed on these devices by the constant application of a field to those areas desired to appear clear. Once the field is removed, the clear areas switch back to opaque in about 10–100 seconds.

U.S. patent application Ser. No. 866,216 teaches liquid crystal-polymeric materials having optical memory in that light scattering devices that include the materials can be manipulated to display contrasting opaque and clear areas which are field independent. The memory materials of U.S. patent application Ser. No. 866,216 are, in general, made by forming a homogeneous solution of liquid crystal and thermoplastic polymer heated to a temperature effective to dissolve the liquid crystal, and then cooling the solution to affect phase separation of the liquid crystal and the formation of microdroplets. Memory is made possible by the selection of a liquid crystal which remains in the liquid crystalline state at temperatures above the softening temperature of the thermoplastic. Since the liquid crystal is in the liquid crystalline state while the thermoplastic is soft, the optic axes of the microdroplets can be aligned by an external field. Maintaining the external field while the thermoplastic is rehardened results in a material in which the microdroplets exposed to the field remain aligned upon removal of the field. An external field applied to the entire surface of a film during hardening of the thermoplastic will result in a wholly transparent material; a patterned field as, for instance, an alphanumeric character, applied during hardening of the thermoplastic will result in a material displaying a clear (transmitting) character in an opaque (scattering) field. The clear area or areas will remain so until the random alignment of the optic axes is restored by reheating the material and cooling it in the absence of a field.

While this type of memory achieved by the selective application of thermal and electric or magnetic fields has many useful applications, it would be advantageous in many instances to have a memory not dependent upon thermal energy and characterized by faster switching times and greater transparencies than previously achievable.

DISCLOSURE OF THE INVENTION

The invention provides a new liquid crystal-plastic display material having submillisecond switching times and an electrooptic memory. The material comprises microdroplets of liquid crystal dispersed in a plastic matrix, the liquid crystal being present in an amount of at least 50% by weight. The material is prepared by the phase separation of a homogeneous solution of liquid crystal and synthetic polymer. Phase separation results in a liquid crystalline rich phase in the form of microdroplets and a plastic rich phase containing dissolved liquid crystal in solid solution. The dissolved liquid crystal alters the refractive index and the dielectric properties of the plastic, and lowers the temperature at which the plastic softens. The resulting liquid crystal display materials ion have submillisecond switching rates and transparencies on the order of 90%. The new material is further characterized by high resistivity and permittivity so that it acts as a capacitor to retain a charge when charged between two electrodes, whereby the optic axes of the liquid crystal microdroplets will remain aligned and an image will be retained for a period of time ("memory time") after the voltage has been turned off.

As used in the specification and claims, the term "plastic" means a synthetic polymer which has been blended or plasticized with liquid crystal. The plastic materials of the invention display thermoplastic properties, i.e., they soften when exposed to heat and return to their original condition when cooled. The thermoplastic property is preferably achieved by employing a thermoplastic The blend of liquid crystal and polymer exhibits physical properties, such as refractive index $n_s$ and softening temperature, and electrical properties, such as resistivity and permittivity, which may be altered from those of the unblended polymer due to the presence of dissolved liquid crystals.

The term "homogeneous solution" or "single phase" solution refers to a miscible mixture of liquid crystal and polymer macroscopically appearing clear and homogeneous. The solution may be a liquid solution, a solid solution or in between. A homogeneous solution may be achieved by heating the polymer to a temperature effective to dissolve the liquid crystal or by dissolving cured plastic in a solvent in which the liquid crystal is miscible. "Phase separation" means altering the homogeneous solution to cause the dissolved liquid crystal to separate into a liquid crystalline-rich phase in the form of microdroplets and the thermoplastic to separate into a plasticrich, coherent matrix plasticized by dissolved liquid crystal remaining in solid solution. For purposes of the present invention, phase separation may be affected by cooling or solvent evaporation, respectively; it is contemplated that in some instances phase separation may be achieved by curing.

"Resistivity" and "permittivity" refer to the electrical properties of the liquid crystalline-plastic material of the invention and are used in the generally understood sense without regard to systems of measurement. The value of the product of the resistivity and the permittivity of the material of the invention is expressed in units of time and represents the memory time of the material. "memory material" refers to a material of the invention having a memory time of approximately a second or greater so that the material, when charged by conducting electrodes, will act as a capacitor to retain the charge when the voltage is removed. "memory" refers to the image memory of the material of the invention wherein the material or selected areas of the material are driven to the clear, transmitting state by the application of a voltage across transparent conducting electrodes applied to the material and wherein the material or selected areas remain clear and transparent upon the removal of the voltage for the memory time of the material unless switched to the opaque non-transmitting state by short circuiting, where upon the material remains opaque until driven clear "Switching time" refers to the time for the material of the invention to respond to an applied voltage pulse by clearing and to the time for the material to turn opaque by short circuiting. Switching time to the ON (clear) state is generally shorter than the switching time to the OFF (opaque) state by short circuiting. In the material of this invention, the switching time is very short compared to the memory time.

The "transparency" or "transparency coefficient" refers to the ratio of light passing through the material when switched to its clear state to the light passing through electrodes in the absence of the material.

In accordance with the invention, there is provided a liquid crystalline-plastic material wherein the liquid crystal is dispersed in the plastic as microdroplets having a size effective to scatter incident light, the liquid crystal being present in the material in an amount of at least 50% by weight, and wherein the plastic has an index of refraction $n_s$ matching the ordinary index of refraction $n_o$ of the liquid crystal so that the material will transmit on the order of 90% of incident light when a voltage is applied, and the material being further characterized by a switching time on the order of less than about 1.0 millisecond.

The material of the invention is further characterized by a memory time on the order of a few seconds or longer, whereby the material will act as a capacitor to retain a charge when placed between two charged electrodes.

The discovery that the blend of liquid crystal and polymer exhibits altered physical properties compared to the unblended polymer makes possible the fabrication of devices with selected features heretofore unavailable.

The switching time of the material is affected by the microdroplet size and the relative larger microdroplet sizes and values of $n_s$ and $n_o$. For instance, values of $n_s$ greater than $n_o$ generally yield longer switching times. Normally, the indices of refraction of liquid crystals cannot be altered without significantly altering their other properties and rendering them less useful for display purposes. The material of the present invention allows for the fine adjustment of the index of refraction $n_s$ of the plastic in which the liquid crystal is entrapped. The index of refraction $n_s$ of the plastic can be adjusted to match, or to mismatch in a specified way, the ordinary index of refraction $n_o$ of the liquid crystal. This adjustment regulates transparencies and switching times of the materials to optimize materials for specific applications For instance, flat panel displays, such as television, where images on the display screen are updated at a rate the human eye cannot detect, require switching times on the order of about a millisecond. Such displays also require high transparency in the ON or clear state in order to achieve a high degree of brightness or contrast in the displayed images. Flat panel displays utilizing the light scattering liquid crystalline-plastic material of the present invention can exhibit these desired features since the value of the refractive index of the plastic is adjustable relative to the ordinary index of refraction of the liquid crystal.

Other applications, such as alphanumeric time-temperature displays where the image does not need to be updated at a high switching speed, may require a larger viewing angle so that the image may be read from the side of the display in preference to straight on. Large viewing angles are exhibited by the liquid crystalline-plastic material of the present invention when the relative value of the refractive index of the plastic is altered to match an effective index of refraction presented by the aligned liquid crystal microdroplet at an angle from the optic axis, that is, an index somewhere between the ordinary and extraordinary indices.

The discovery that the material of the invention exhibits altered electrical properties makes possible the fabrication of liquid crystal devices which combine fast switching times and high transparency with memory. Such devices simplify the fabrication of flat panel displays by providing less complicated and expensive manufacturing procedures, and provide for new types of optical processing devices in which the memory can be periodically refreshed to maintain an image indefinitely.

Suitable liquid crystals are of the nematic type or those which behave as nematic type liquid crystals. Preferred liquid crystals comprise cyanobiphenyls, and may be mixed with cyanoterphenyls and with various esters.

Preferable polymers yield plastics which exhibit dielectric properties such that the product of the resistivity and the permittivity is at least on the order of a few seconds or longer. Most preferable are polymers which, by the techniques of the present invention, form homogeneous solutions with liquid crystals, wherein the liquid crystal is present in an amount of at least 50%, and which will phase separate into a coherent plastic rich phase in the form of a matrix surrounding a liquid crystal rich phase in the form of microdroplets.

Still other features and advantages will become apparent to those skilled in the art from the following description of the best modes of the invention and the accompanying drawings.

BEST MODE FOR CARRYING OUT THE INVENTION

The material of the invention is prepared by the phase separation of a homogeneous solution of synthetic polymer and liquid crystal wherein the liquid crystal to polymer ratio is at least 1:1 by weight. The preferred method of preparing the homogeneous solution depends upon the characteristics of the synthetic polymer. For thermoplastic polymers which can dissolve liquid crystal at a temperature nondestructive of the liquid crystal, the homogeneous solution is prepared by simply heating the polymer and the liquid crystal to a temperature sufficient to dissolve the liquid crystal. For thermoplastics with high, destructive melting temperatures the homogeneous solution is preferably prepared by dissolving, by weight, 1 part polymer to at least 1 part liquid crystal in about 5 parts suitable solvent. Once the material is initially prepared by solvent evaporation, all subsequent manipulation of the material, such as cell construction or reworking, is accomplished in the same way as for materials initially prepared with a thermoplastic, i.e., heating to a flowable state and cooling to reform microdroplets of liquid crystal.

An important feature of the material of the present invention is the high ratio of liquid crystal to polymer, at least 1:1 and preferably about 1.5-2.0:1. The high concentration of liquid crystal yields materials with high contrast between clear and opaque areas, making easily readable displays. Table IA summarizes the ratios of polymer to liquid crystal for various materials made in accordance with the invention as in Example VII below. Table IB lists the properties of the cells fabricated with the materials and ratios of Table IA.

TABLE IA

| Polymer | Liquid Crystal | Ratio |
|---|---|---|
| 1. poly(vinyl acetate) | E7 | 1:<1 |
| 2. poly(vinyl acetate) | E7 | 1:1.5 |
| 3. poly(vinyl formal) | E7 | 1:0.6 |
| 4. poly(vinyl formal) | E7 | 1:1.8 |
| 5. polycarbonate | E7 | 1:1.8 |
| 6. poly(vinyl butyral) | E7 | 1:1.5-2.0 |
| 7. poly(vinyl methyl ketone) | E31 | 1:2.0 |
| 8. poly(methyl acrylate) | E20 | 1:1.5 |

TABLE IA-continued

| Polymer | Liquid Crystal | Ratio |
|---|---|---|
| 9. poly(cyclohexyl methacrylate) | E31 | 1:2.0 |
| 10. polyisoprene | E20 | 1:2.0 |
| 11. poly(ethyl methacrylate) (high M.W.) | E20 | 1:2.0 |
| 12. poly(isobutyl methacrylate) | E20 | 1:2.0 |

TABLE IB

| Polymer | Property of Cell |
|---|---|
| 1. poly(vinyl acetate) | no phase separation |
| 2. poly(vinyl acetate) | fair |
| 3. poly(vinyl formal) | no phase separation |
| 4. poly(vinyl formal) | excellent |
| 5. polycarbonate | fair |
| 6. poly(vinyl butyral) | excellent |
| 7. poly(vinyl methyl ketone) | excellent |
| 8. poly(methyl acrylate) | excellent |
| 9. poly(cyclohexyl methacrylate) | good |
| 10. polyisoprene | good |
| 11. poly(ethyl methacrylate) (high M.W.) | good |
| 12. poly(isobutyl methacrylate) | fair |

The properties of the cells listed in Table IB were assessed as follows:

| | fair | good | excellent |
|---|---|---|---|
| transparency | <60% | ~70-90% | >90% |
| switching time | 50-100 msec | 10-50 msec | <10 msec |
| contrast | medium | medium to high | high |

As seen in tabel IB, ratios of polymer to liquid crystal greater than about 1:1 did not result in useful cells. No macroscopically visible phase separation was observed for cells No. 1 and No. 3 in that the resultant films were clear.

Figure 1:
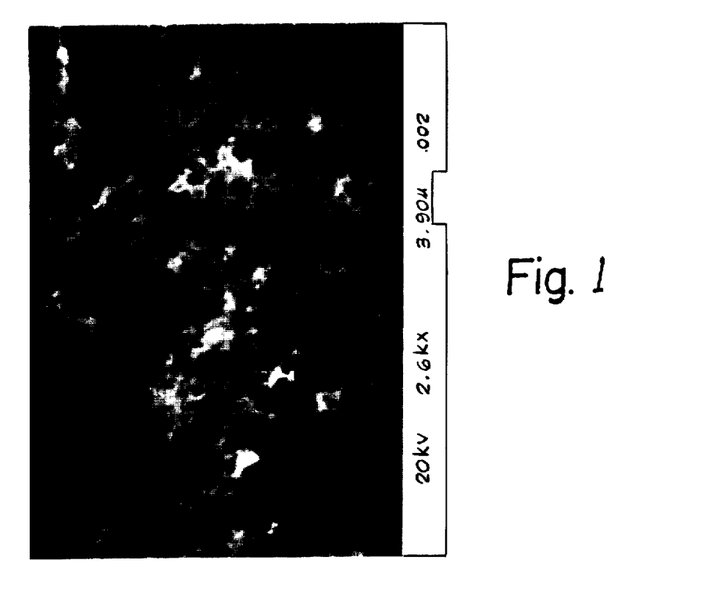
FIG. 1 is a photomicrograph of the material of the invention.

An important property of the liquid crystallineplastic material of the invention is that the plastic forms a coherent closed-cell type matrix around the microdroplets of liquid crystal. FIG. 1 is a photomicrograph of the material of Example II showing a honey comb-like structure formed by the phase separation of poly(methyl methacrylate) and liquid crystal E7. The closed cell type matrix maximizes the amount of liquid crystal entrapped in the material, yet yields a sturdy sheet or film that does not allow the liquid crystal to bleed out.

The index of refraction $n_p$ of the polymer is adjusted to a value of $n_s$ by the plasticizing with liquid crystal which occurs during phase separation and microdroplet growth. Transparency is affected by the relative values of $n_s$ of the plastic and $n_o$ of the liquid crystal. For instance, in the case of devices using nematic liquid crystals of the cyano-phenyl type, $n_o \simeq 1.51$; therefore to achieve maximum transparency for normally incident light the plastic $n_s$ should be as near as possible to 1.51.

Likewise, the relative values of $n_s$ and $n_o$ affect the switching time from the on (transparent) to the off (opaque) states. Tables IIA and IIB summarize the $n_p$ values and the properties of cells made with various polymers and liquid crystal E7 as in Example 1 below.

TABLE IIA

| Polymer | $n_p$ | switch time |
|---|---|---|
| Poly(vinyl formal) | 1.501 | 1.0 msec |
| Poly(methyl methacrylate) | 1.49 | ~2.0 msec |
| Poly(vinyl butyral) | 1.485 | >2.0 msec |

TABLE IIA-continued

| Polymer | $n_p$ | switch time |
| --- | --- | --- |
| Polycarbonate | 1.585 | >10 msec |
| Poly(vinyl acetate) | 1.467 | ~10-20 msec |

TABLE IIB

| Polymer | transparency | Viewing angle |
| --- | --- | --- |
| Poly(vinyl formal) | >95% | normal |
| Poly(methyl methacrylate) | ~95% | normal |
| Poly(vinyl butyral) | ~90% | normal |
| Polycarbonate | ~55% | 30° from normal |
| Poly(vinyl acetate) | ~70% | normal |

The effect of the dissolved liquid crystal is to increase or decrease the index of refraction $n_p$ of the polymer to yield an effective index of refraction $n_s$ closer to that of the liquid crystal $n_o$.

The amount of dissolved liquid crystal in the polymer can be further controlled by the rate of cooling during the phase separation process. A rapid rate of cooling generally yields materials with small droplets and a larger amount of dissolved liquid crystal, whereas slow cooling rates generally yield large droplets with a lesser amount of dissolved liquid crystal in the plastic. Cyanobiphenyl liquid crystals such as E7 have the effect of increasing the index $n_p$ of the polymer to an effective index $n_s$; the degree of increase in $n_p$ depends on the concentration of dissolved liquid crystal and initial value of $n_p$.

Figure 2A:
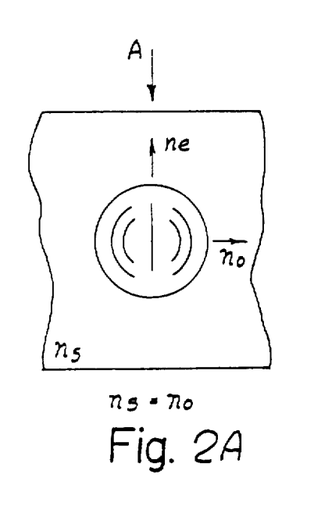
FIGS. 2A and 2B are diagrammatic illustrations of scattering or viewing angles of light incident on a microdroplet of liquid crystal in the material of the invention.
Figure 2B:
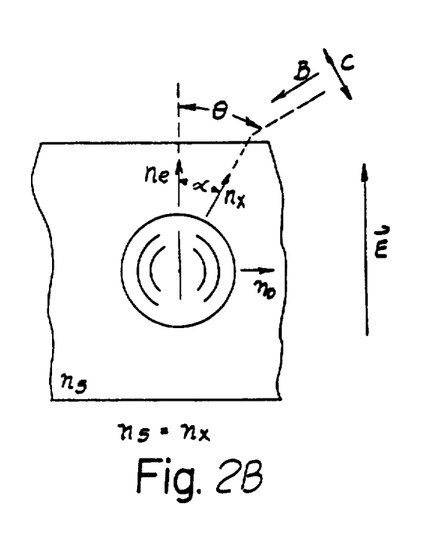

As illustrated in FIG. 2A, in the case of displays which will be viewed straight on in direction A, a polymer with an index $n_p$ in the range of 1.49–1.50 is desired, so that the final index of refraction $n_s$ of the plastic is as close to $n_o \approx 1.51$ as possible. For displays to be viewed from the side, as shown in FIG. 2B, a polymer with an index of refraction $n_p$ greater than $n_o$, but usually less than $n_e$, is preferable so that $n_s$ of the polymer matches an effective index $n_x$ of the liquid crystal. Such a display is most easily readable in direction B, as shown in FIG. 2B. As seen in Table IIB, polycarbonate, with $n_p = 1.585$ yields a display best viewed about 30° from normal. Referring to FIG. 2B, the effective index $n_x$ is approximated by the formula $$n_x \simeq \frac{n_e n_o}{(n_o^2 \sin^2 \alpha + n_e^2 \cos^2 \alpha)^{\frac{1}{2}}}$$

where $$\sin \alpha = \frac{\sin \theta}{n_s}.$$

$\theta$ is the viewing angle; $\alpha$ is the angle from $n_e$ to the effective $n_x$ and C is the direction of propagation of incident light.

A most important feature of the materials of the present invention is high resistivity and permittivity to yield long memory times. Cells incorporating the material hold a charge which, in turn, holds the optic axes of the microdroplets of the material in the aligned position until the charge is short circuited or decays. While the charge is held, the material exhibits an image memory not dependent on an external field. The principle of operation is that a film of the material placed between transparent conducting electrodes to form a cell acts as a capacitor of capacitance C and internal resistance R. Application of a voltage charges the capacitor and upon its removal the charge is maintained, holding the transparent state of the film for a period of time approximately equal to the product of $R \times C$. The value of $R \times C$ does not, in general, depend on the size or configuration of the capacitor, but only on the electrical properties of the liquid crystalline-plastic material of the invention: $C = \epsilon A/d$, where $\epsilon$ is the permittivity of the material, A the surface area of the film and d its thickness, and $R = \sigma d/A$ where $\sigma$ is the resistivity of the material; thus, discharge time, the product of $\epsilon \times \sigma$ is a material property and not a function of cell size or configuration. Table III summarizes memory time ($\epsilon \sigma$) for various materials made in accordance with the invention as in Example VII below.

TABLE III

| Polymer | Liquid Crystal | Ratio | Memory Time ($\epsilon \rho$) |
| --- | --- | --- | --- |
| poly(methyl acrylate) | E20 | 1:2 | <1 sec |
| poly(cyclohexyl methacrylate) | E31 | 1:2 | >1 sec |
| polyisoprene | E20 | 1:2 | >1 sec |
| poly(isobutyl methacrylate) | E20 | 1:2 | >1 sec |
| poly(vinyl butyral) | E7 | 1:1.5–2.0 | >1 sec |
| poly(vinyl methyl ketone) | E20 | 1:2 | >1 sec |

Other liquid crystalline-plastic materials exhibiting extended memory appear in the examples.

The best modes of the invention are further illustrated and described by the following specific examples.

EXAMPLE I

Poly(vinyl formal) (from Aldrich Chemical Company, Inc., Milwaukee, Wis.) was mixed with liquid crystal E7 (from EM Chemicals, a mixture consisting of (by weight) 4'-n-pentyl-n-cyano-biph-enyl (5CB), 51%, 4'-n-heptyl-n-cyano-biphenyl (7CB), 21%, 4'-n-octoxy-4-cyano-biphenyl, 16%, and 4'-n-pentyl-4-cyano-terphenyl, 12%) and chloroform in the ratio of 1:1.5:5.0 by weight and stirred until a clear homogeneous solution formed. The solution was poured out on a glass plate and the chloroform was evaporated to form an opaque, solid liquid crystallineplastic material. The material was heated on a hot stage until it softened, sandwiched between glass slides with transparent conducting electrodes and allowed to cool at a moderate rate to room temperature to form an opaque scattering cell. A moderate cooling rate was achieved by wrapping the cell in a single piece of tissue paper (KIMWIPES, Kimberly-Clark Corp. Roswell, Ga.) for insulation and placing the cell between two aluminum blocks at room temperature.

The transparency of the film was measured by placing the cell in a chopped laser-beam with photodetector, switching the cell to a clear transparent state by the application of 50 volts, measuring the amount of light transmitted and comparing it to the amount transmitted by the glass slides alone. The poly(vinyl formal) cell yielded a transparency coefficient of 96%. The switching time from the ON to the OFF state was recorded by the photodetector at less than 1.0 millisecond at room temperature.

EXAMPLE II

Poly(methyl methacrylate) (Aldrich) was mixed with liquid crystal E7 and acetone in the ratio of 1:1.5:5.0 by weight and an opaque cell formed as in Example I. The transparency coefficient was greater than 90% and the switching time recorded at about 2.0 milliseconds at room temperature.

EXAMPLE III

Poly(vinyl formal) (Aldrich) cells as in Example I were fabricated with liquid crystals E-20, E-31, and E-40 (all proprietary mixtures of cyanobiphenyls and esters available from EM Chemicals). Substantially similar switching times and transparencies as reported in Example I were observed.

EXAMPLE IV

Poly(vinyl formal) (Aldrich) was mixed with liquid crystal E-20 and chloroform in the ratio of 1.0:1.5:5.0 by weight to form a clear homogeneous solution. The solvent was evaporated to yield a bulk opaque material. Three aliquots of the material were placed between three sets of glass slides with transparent conducting electrodes. The slides were heated on a hot stage until the material softened and flowed evenly between the slides, and then cooled to form opaque, scattering cells as in Example I. The thickness of the cells was measured by the amount of voltage needed to switch each cell from opaque to scattering. The three cells yielded switching voltage thresholds of 400V, 200V and 80V. At its switching voltage threshold, each cell became transparent in less than 1.0 millisecond. The voltage was removed and the cells remained transparent. The two thicker cells (400V and 200V) remained clear for about 1 minute before returning to the opaque state; the thinner cell (80V) remained clear for a few seconds. After the three cells returned to the opaque state, they were switched to clear again by the application of their respective threshold voltages and short circuited. Short circuiting the cells caused each to switch to the opaque state in less than 1.0 millisecond.

EXAMPLE V

Poly(methyl methacrylate) (Aldrich) was mixed with liquid crystal E7 and trichloromethane in a ratio of 1:2:5 to form a homogeneous solution. The solvent was then evaporated and a cell formed as in Example I, except that the transparent conducting electrodes were patterned with an alphanumeric character. A voltage of 200V applied to the cell switched the film from opaque to a clear alphanumeric character in an opaque field. The voltage was removed and the image of the character remained for about 10 seconds.

EXAMPLE VI

Poly(methyl methacrylate) was mixed with liquid crystal E20 and trichloromethane in a ratio of 1:2:5. A cell constructed with the resultant material, as in Example V, held an image of the alphanumeric character for about 10 seconds.

EXAMPLE VII

Poly(vinyl butyral) (Aldich) was mixed with liquid crystal E7 in a ratio of 1:2 by weight. The mixture was heated to about 150° C. until a clear homogeneous solution formed. The solution was squeezed between glass slides with transparent electrodes and cooled to room temperature at a moderate rate as in Example I. The transparency of the film was about 90% and the switching time was about 5 milliseconds.

EXAMPLE VIII

Electrooptic cells referred to in Tables I-III above were fabricated according to the method of Example I with the following solvents at a ratio of about 1 part polymer to about 5 parts solvent.

| Polymer | solvent |
|---|---|
| Poly(vinyl acetate) | acetone |
| poly(vinyl formal) | chloroform |
| polycarbonate | chloroform |
| poly(vinyl butyral) | acetone |
| poly(vinyl methyl ketone) | chloroform |
| poly(methyl acrylate) | toluene |
| poly(cyclohexyl methacrylate) | methylene chloride |
| poly(isoprene) | chloroform |
| poly(ethyl methacrylate) (high M.W.) | acetone |
| poly(isobutyl methacrylate) | acetone |
| poly(methyl methacrylate) | acetone |

Many modification and variations of the invention will be apparent to those skilled in the art in light of the foregoing detailed disclosure. Therefore, it is to be understood that, within the scope of the appended claims, the invention can be practiced otherwise than as specifically shown and described.

We claim:

1. A liquid crystalline-plastic material wherein liquid crystal is dispersed in set plastic as microdroplets having a size effective to scatter incident light, the liquid crystal being present in the material in an amount of at least 50% by weight and wherein the plastic has an index of refraction $n_s$ matching the ordinary index of refraction $n_0$ of the liquid crystal so that the material will transmit on the order of 90% of incident light when a voltage is applied, and said material being further characterized by a resistivity and a permittivity such that the product of the two is on the order of a few seconds or longer, whereby the material will act as a capacitor to retain a charge when charged between two electrodes.

2. A liquid crystalline-plastic material wherein liquid crystal is dispersed in set plastic as microdroplets having a size effective to scatter incident light, the liquid crystal being present in the material in an amount of at least 50% by weight and wherein the plastic has an index of refraction $n_s$ matching the ordinary index of refraction $n_o$ of the liquid crystal so that the material will transmit on the order of 90% of incident light when a voltage is applied, and said material being further characterized by a switching time on the order of less than about 1.0 millisecond.

3. A liquid crystalline-plastic material wherein liquid crystal is dispersed in set plastic as microdroplets having a size effective to scatter incident light, the liquid crystal being present is an amount of at least 50% by weight and wherein the plastic has an index of refraction $n_s$ sufficiently greater than the ordinary index of refraction $n_o$ of the liquid crystal so that the material will have maximum transparency in the presence of an applied field at an angle of less then 90° to the surface of the material.

4. A liquid crystalline-plastic material wherein the liquid crystal is dispersed in the plastic as microdroplets having a size effective to scatter incident light, the liquid crystal being present in the material in an amount of at least 50% by weight, wherein the plastic has an index of refraction $n_s$ matching the ordinary index of refraction $n_o$ of the liquid crystal so that the material will transmit on the order of 90% of incident light when a voltage is applied, and wherein the plastic has the characteristic of forming a homogeneous solution with the liquid crystal and of undergoing phase separation from the liquid crystal to form a coherent matrix surrounding microdroplets of liquid crystal, said material being characterized by a resistivity and a permittivity such that the product of the two is on the order of a few seconds or longer, whereby the material will act as a capacitor to retain a charge when charged between two electrodes and said material being further characterized by a switching time on the order of less than about 1.0 milliseconds.

5. A liquid crystalline-plastic material as claimed in claims 1, 2, 3, or 4 wherein the liquid crystal comprises a nematic liquid crystal.

6. A liquid crystalline-plastic material as claimed in claim 5 wherein the nematic liquid crystal comprises a cyanobiphenyl.

7. A liquid crystalline-plastic material as claimed in claims 1, 2, 3 or 4 wherein the plastic is selected from the group consisting of poly(vinyl butyral), poly(vinyl acetate), poly(vinyl formal), polycarbonate, poly(vinyl methyl ketone), poly(methyl acrylate), poly(cyclohexyl methacrylate) poly(isobutyl methacrylate) and poly(methyl methacrylate).

8. A method of making a liquid-crystalline plastic material comprising the steps of forming a homogeneous solution of plastic and at least 50% by weight liquid crystal and phase separating the solution to form microdroplets of liquid crystal dispersed in a coherent closed-cell-like matrix of plastic.

9. The method of claim 8 wherein the step of forming the homogeneous solution includes heating the plastic to a temperature effective to dissolve the liquid crystal and wherein the step of phase separating is carried out by cooling.

10. The method as claimed in claim 8 wherein the step of forming the homogeneous solution includes dissolving the plastic and the liquid crystal in about 5 parts solvent and wherein the step of phase separation is carried out by evaporating the solvent.

11. The method as claimed in claim 8 wherein the liquid crystal comprises a nematic liquid crystal.

12. The method as claimed in claim 11 wherein the nematic liquid crystals comprises a cyanobiphenyl.

13. The method as claimed in claim 8 wherein the plastic is selected from the group consisting of poly(vinyl butyral), poly(vinyl acetate), poly(vinyl formal), polycarbonate, poly(vinyl methyl ketone), poly(methyl acrylate), poly(cyclohexyl methacrylate) poly(isobutyl methacrylate) and poly(methyl methacrylate).

14. An electro-optic device capable of transmitting and scattering incident light and having memory comprising:
   a pair of transparent conducting electrodes;
   a sheet of liquid crystalline-plastic material sandwiched between the electrodes, said material containing liquid crystal in the form of microdroplets and further containing plastic in the form of a closed cell-like structure surrounding the microdroplets, said liquid crystal being present in the material in an amount of at least 50% by weight, said material characterized by a resistivity and a permittivity such that the product of the two is on the order of a few seconds or longer whereby the material will act as a capacitor to retain a charge between the electrodes and further characterized by a switching time on the order of less than about 1.0 microseconds upon shortcircuiting of the charge.

15. An electrooptic device as claimed in claim 14 wherein the liquid crystal comprises a nematic liquid crystal.

16. An electrooptic device as claimed in claim 15 wherein the liquid crystal comprises a cyanobiphenyl.

17. An electrooptic device as claimed in claim 14 wherein the plastic has an index of refraction $n_s$ matching the ordinary index $n_o$ of the liquid crystal so that at least about 90% of incident light is transmitted when the device is on.

18. An electrooptic device as claimed in claim 14 wherein the plastic is selected from the group consisting of poly(vinyl butyral), poly(vinyl acetate), poly(vinyl formal), polycarbonate, poly(vinyl methyl ketone), poly(methyl acrylate), poly(cyclohexyl methacrylate) poly(isobutyl methacrylate) and poly(methyl methacrylate).

* * * * *

UNITED STATES PATENT AND TRADEMARK OFFICE
CERTIFICATE OF CORRECTION

PATENT NO. : 4,671,618

DATED : June 9, 1987

INVENTOR(S) : Bao-Gang Wu and J. William Doane

It is certified that error appears in the above-identified patent and that said Letters Patent is hereby corrected as shown below:

On the cover sheet, Bao-Gang Wu's address "947 Allerton Street" should read --967 Allerton Street--.

Column 1, line 23, insert a period after "weight".

Column 2, line 56, delete "ion" and insert --can--.

Column 3, line 4, after "thermoplastic" insert --polymer (synthetic resin)--.

line 50, insert a period after "clear".

Column 4, line 32, insert a period after "applications".

Column 6, line 33, delete "tabel" and insert --Table--.

Column 8, line 11, delete "R=$\sigma$d/A" and insert --R=$\rho$d/A--;

line 11, after "where" delete "$\sigma$" and insert --$\rho$--;

line 14, after "memory time" delete ($\epsilon\sigma$) and insert --($\epsilon\rho$)--.

line 37, delete "biph-enyl" and insert --biphenyl--.

Column 10, line 34, delete "no" and insert --$n_o$--.

UNITED STATES PATENT AND TRADEMARK OFFICE
CERTIFICATE OF CORRECTION

PATENT NO. : 4,671,618

DATED : June 9, 1987

INVENTOR(S) : Bao-Gang Wu and J. William Doane

It is certified that error appears in the above-identified patent and that said Letters Patent is hereby corrected as shown below:

Column 10, line 61, delete "then" and insert --than--.

Signed and Sealed this

Twenty-sixth Day of April, 1988

*Attest:*

DONALD J. QUIGG

*Attesting Officer*     *Commissioner of Patents and Trademarks*

UNITED STATES PATENT AND TRADEMARK OFFICE
CERTIFICATE OF CORRECTION

PATENT NO : 4,671,618
DATED : June 9, 1987
INVENTOR(S) : WU et al.

It is certified that error appears in the above-identified patent and that said Letters Patent is hereby corrected as shown below:

Insert the following paragraph at column 1, line 5:

---The United States government has a paid-up license in this invention and may have the right in limited circumstances to require the patent owner to license others on reasonable terms as provided for by the terms of Grant DMR85-03219, awarded by the National Science Foundation.---

Signed and Sealed this

Twenty-ninth Day of December, 1998

Attest:

BRUCE LEHMAN

Attesting Officer

Commissioner of Patents and Trademarks